(12) United States Patent
Aamir et al.

(10) Patent No.: US 11,969,690 B1
(45) Date of Patent: Apr. 30, 2024

(54) SCRUBBER FOR H₂S REMOVAL FROM CONTINUOUS BIOGAS FLOW

(71) Applicant: KING FAISAL UNIVERSITY, Al-Ahsa (SA)

(72) Inventors: Muhammad Aamir, Al-Ahsa (SA); Muhammad Hassan, Al-Ahsa (SA); Chao Zhao, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/215,754

(22) Filed: Jun. 28, 2023

(51) Int. Cl.
| | | |
|---|---|---|
| *B01D 53/02* | (2006.01) |
| *B01D 53/04* | (2006.01) |
| *B01J 20/10* | (2006.01) |
| *B01J 20/20* | (2006.01) |
| *B01J 20/22* | (2006.01) |
| *B01J 20/28* | (2006.01) |

(52) U.S. Cl.
CPC ........ *B01D 53/0407* (2013.01); *B01J 20/103* (2013.01); *B01J 20/20* (2013.01); *B01J 20/226* (2013.01); *B01J 20/28052* (2013.01); *B01D 2253/102* (2013.01); *B01D 2253/106* (2013.01); *B01D 2253/204* (2013.01); *B01D 2253/25* (2013.01); *B01D 2257/304* (2013.01); *B01D 2258/05* (2013.01)

(58) Field of Classification Search
CPC .......... B01D 53/0407; B01D 2253/102; B01D 2253/106; B01D 2253/204; B01D 2253/25; B01D 2257/304; B01D 2258/05; B01J 20/103; B01J 20/20; B01J 20/226; B01J 20/28052

See application file for complete search history.

(56) References Cited

U.S. PATENT DOCUMENTS

| | | | |
|---|---|---|---|
| 6,544,483 B1 * | 4/2003 | Kim | B01D 53/8659 422/177 |
| 2014/0360891 A1 | 12/2014 | Kline et al. | |
| 2015/0020993 A1 * | 1/2015 | Amendola | C09K 5/16 165/10 |
| 2015/0328578 A1 | 11/2015 | Deckman et al. | |

(Continued)

FOREIGN PATENT DOCUMENTS

| | | |
|---|---|---|
| CA | 2859256 A1 | 2/2015 |
| CN | 105056882 A | 11/2015 |

(Continued)

OTHER PUBLICATIONS

Hagemann "Activated Carbon, Biochar and Charcoal: Linkages and Synergies across Pyrogenic Carbon's ABCs" (Year: 2018).*

*Primary Examiner* — Christopher P Jones
(74) *Attorney, Agent, or Firm* — Nath, Goldberg & Meyer; Richard C. Litman

(57) ABSTRACT

Methods and systems for scrubbing and removing hydrogen sulfide from a biogas. The methods and systems use a hydrogen sulfide removal media comprising biomass derived biochar, activated carbon, silica gel, and metal organic framework inside a tube through which the biogas passes to scrub the hydrogen sulfide from the biogas. The methods and systems are capable of achieving are about 95% reduction of hydrogen sulfide present in the biogas.

14 Claims, 4 Drawing Sheets

(56) References Cited

U.S. PATENT DOCUMENTS

| | | | |
|---|---|---|---|
| 2015/0360166 A1* | 12/2015 | First | B01D 53/04 96/108 |
| 2021/0031168 A1* | 2/2021 | Coignet | B01D 53/0462 |
| 2021/0237031 A1* | 8/2021 | Basheer | B01J 20/28071 |
| 2021/0260561 A1* | 8/2021 | Onaizi | B01J 20/28083 |
| 2022/0403273 A1* | 12/2022 | Dolan | B01D 53/0462 |

FOREIGN PATENT DOCUMENTS

| | | | |
|---|---|---|---|
| CN | 107569969 A | 1/2018 | |
| GB | 2602485 A | 7/2022 | |
| WO | 201809497 A1 | 1/2018 | |
| WO | 2021258060 A1 | 12/2021 | |

* cited by examiner

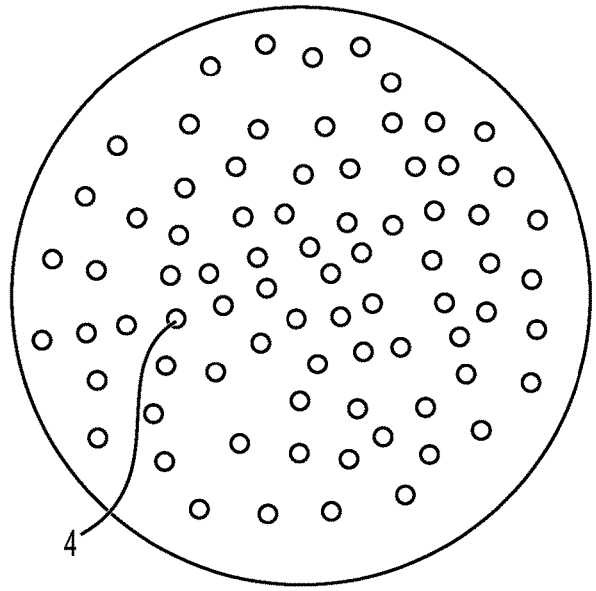
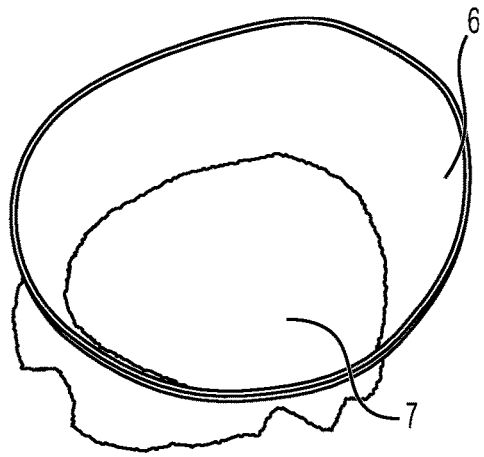
FIG. 4A      FIG. 4B
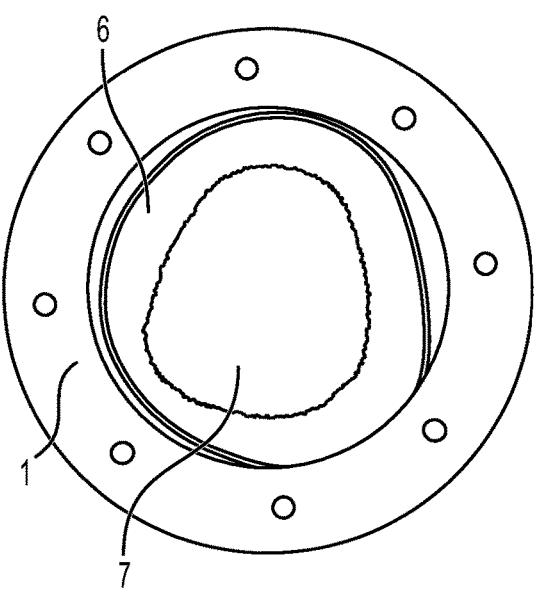
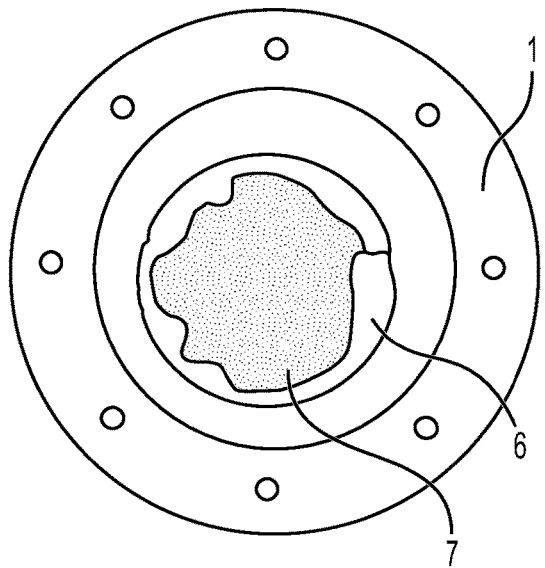
FIG. 4C      FIG. 4D

SCRUBBER FOR H₂S REMOVAL FROM CONTINUOUS BIOGAS FLOW

BACKGROUND

1. Field

The present disclosure relates to a scrubber designed to refine biogas content. More specifically it relates to a scrubber designed to remove hydrogen sulfide ($H_2S$) from a continuous biogas flow.

2. Description of the Related Art

In the drilling, production, transport, storage, and processing of crude oil, including wastewater associated with crude oil production, and in the storage of residual fuel oil, hydrogen sulfide and mercaptans are often encountered. The presence of hydrogen sulfide and mercaptans is objectionable because they often react with other hydrocarbons or fuel system components. Further, hydrogen sulfide and mercaptans are often highly corrosive as well as emit highly noxious odors. Uncontrolled emissions of hydrogen sulfide give rise to severe health hazards. Burning of such vapors neither solves toxic gas problems nor is economical since light hydrocarbons have significant value.

Furthermore, hydrogen sulfide and mercaptans, as well as other sulfhydryl compounds, are often present in the underground water removed with the crude oil, in the crude oil itself, and in the gases associated with such water and oil. When the water and oil are separated from each other, they emit foul odors. For instance, hydrogen sulfide is emitted as a gas which is associated with water and hydrocarbon vapors. Natural gases often contain sulfhydryl compounds.

Current treatments for removal of sulfhydryl compounds, such as hydrogen sulfide, from hydrocarbons and other substrates include the use of various reactive organic compounds. For example, U.S. Pat. No. 6,063,346 discloses the use of a combination of maleimides, formaldehydes, amines, carboxamides, alkylcarboxyl-azo compounds, and cumineperoxide compounds for the removal of hydrogen sulfide contaminants from a fluid. Further, U.S. Pat. No. 5,128,049 discloses the use of certain morpholino and amino derivatives for the removal of hydrogen sulfide content from fluids. In addition, U.S. Pat. Nos. 6,063,346; 5,128,049; and 8,734,637 disclose the use of triazines to remove hydrogen sulfide.

There is a continuing need for alternatives which may be useful in the removal and/or reduction of hydrogen sulfide from liquid and gaseous hydrocarbon streams, particularly from biogases. For example, for commercial electrical production from biogas plants, excessive hydrogen sulfide provide a toxic environment for combustion and corrodes the piston.

Thus, new systems and methods for removing hydrogen sulfide from a biogas solving the aforementioned problems are desired.

SUMMARY

The present subject matter relates to new methods and systems for removing hydrogen sulfide ($H_2S$) from a biogas using a hydrogen sulfide removal media made from biomass derived biochar, activated carbon, silica gel, and a commercial metal organic framework.

In an embodiment, the present subject matter relates to a method of removing hydrogen sulfide from a biogas, the method comprising: inputting a biogas comprising hydrogen sulfide ($H_2S$) to a scrubber comprising a tube having placed therein a hydrogen sulfide removal media comprising a biomass derived biochar, activated carbon, silica gel, and a metal organic framework; passing the biogas through the hydrogen sulfide removal media; and outputting a biogas scrubbed of hydrogen sulfide.

In another embodiment, the present subject matter relates to a system for removing hydrogen sulfide from a biogas, the system comprising: a scrubber comprising a vertically arranged tube having placed therein a hydrogen sulfide removal media comprising a biomass derived biochar, activated carbon, silica gel, and a metal organic framework; a biogas inlet at a bottom end of the tube for receiving a biogas comprising hydrogen sulfide ($H_2S$) into the tube; and a biogas outlet at a top end of the tube for outputting a biogas scrubbed of hydrogen sulfide.

These and other features of the present subject matter will become readily apparent upon further review of the following specification.

BRIEF DESCRIPTION OF DRAWINGS

FIGS. 4A-D are diagrams showing 4A) the scrubber media mounting disc; 4B) the scrubber containing dish; 4C) placement of the media inside the scrubber; and 4D) the media dish fixing inside the scrubber.

DETAILED DESCRIPTION OF THE PREFERRED EMBODIMENTS

Figure 1:
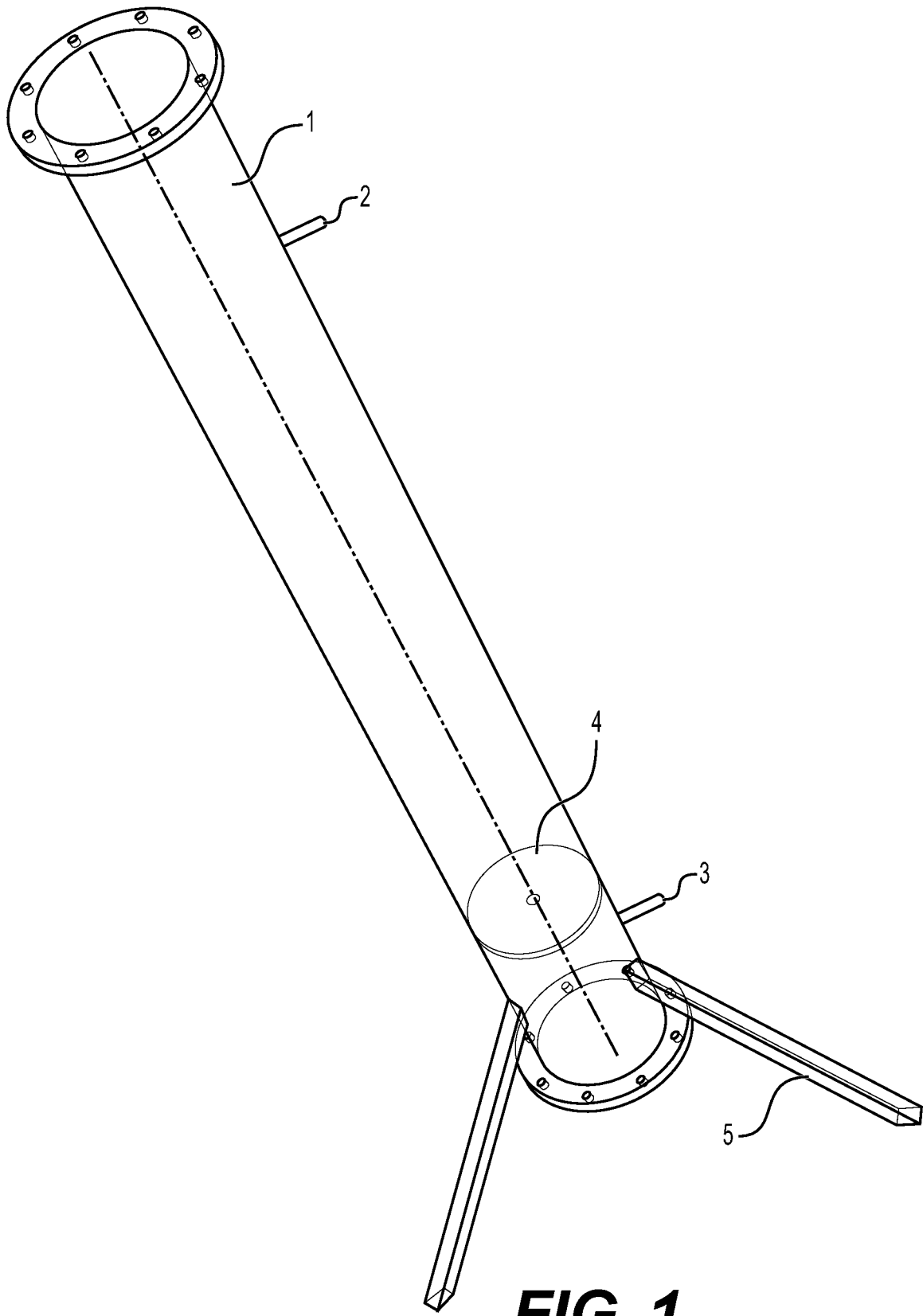
FIG. 1 is a diagram of the present scrubber designed for removing hydrogen sulfide from biogas.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

The present subject matter relates to new methods and systems for removing hydrogen sulfide ($H_2S$) from a biogas using a hydrogen sulfide removal media made from biomass derived biochar, activated carbon, silica gel, and a commercial metal organic framework.

In an embodiment, the present subject matter relates to a method of removing hydrogen sulfide from a biogas, the method comprising: inputting a biogas comprising hydrogen sulfide ($H_2S$) to a scrubber comprising a tube having placed therein a hydrogen sulfide removal media comprising a biomass derived biochar, activated carbon, silica gel, and a metal organic framework; passing the biogas through the hydrogen sulfide removal media; and outputting a biogas scrubbed of hydrogen sulfide.

In certain embodiments, the present methods can remove at least about 95% by weight of the hydrogen sulfide from the biogas. In this regard, the present methods can remove about 90%, about 91%, about 92%, about 93%, about 94%, about 95%, about 95%, about 97%, about 98%, about 99%, or about 95.33% by weight of the hydrogen sulfide from the biogas. The efficiency of the present methods in removing the hydrogen sulfide from the biogas can depend on the biogas flow rate, the residual time of the biogas in the scrubber, the composition of the hydrogen sulfide removal media, and/or the pore volume of the hydrogen sulfide removal media.

In another embodiment, the hydrogen sulfide removal media can comprise about 26% by weight of the biomass derived biochar, about 17% by weight of the activated carbon, about 34% by weight of the silica gel, and about 23% by weight of the metal organic framework. In other embodiments, the hydrogen sulfide removal media can comprise about 21% to about 31% by weight of the biomass derived biochar, about 12% to about 22% by weight of the activated carbon, about 29% to about 39% by weight of the silica gel, and about 18% to about 28% by weight of the metal organic framework. In certain embodiments, the metal organic framework can be a commercial metal organic framework, such as by way of non-limiting example, MOF-74. Similarly, the silica gel can be a commercial silica gel.

In a further embodiment, the biogas input into the scrubber can comprise about 1% to about 5% by weight of the hydrogen sulfide, about 1% to about 3% by weight of the hydrogen sulfide, or about 2.14% by weight of the hydrogen sulfide. Further, the biogas input into the scrubber can be made from cow manure and rice straw in an about 75:25 ratio on a weight basis. The biogas can be made by combining the cow manure and rice straw in a semi-continuous stirring tank reactor (CSTR).

In another embodiment, the tube making up the scrubber can comprise a steel tube, with the hydrogen sulfide removal media placed in a middle of the steel tube. In certain embodiments in this regard, the hydrogen sulfide removal media can have a height of about 30 cm in the middle of the steel tube. In an alternative embodiment, the hydrogen sulfide removal media can be placed at three positions in the scrubber, each placement of the hydrogen sulfide removal media being about 10 cm in length, with a first placement of the hydrogen sulfide removal media being at an entrance of the scrubber, a second placement of the hydrogen sulfide removal media being at a middle of the scrubber, and a third placement of the hydrogen sulfide removal media being before an outlet of the scrubber.

In an embodiment, the biogas can be pressurized up to 6 mbar to enable passing through the hydrogen sulfide removal media. Further, the biogas can pass through the hydrogen sulfide removal media at a rate of about 0.5 L/min. Similarly, the biogas can have a residence time of about 5 min in the scrubber.

In a further embodiment, the biogas scrubbed of hydrogen sulfide can be used, by way of non-limiting example, in a biogas plant that produces electrical energy from biogas. The present methods can likewise be used for various other purposes, for example, for scrubbing biogas produced at dairy farms, to clean burning fuel, and the like.

In another embodiment, the biochar can be made from rice straw. That is, the biochar can be rice straw-based biochar. In this regard, the biochar can be made by pyrolyzing the rice straw at about 550° C.

Further, some of the produced biochar can be used as a precursor to produce the activated carbon through a carbonization procedure. This activated carbon can have a high surface area, a high physio chemical stability, and excellent surface reactivity towards various reagents. In certain embodiments, some of the rice straw biochar can be further disintegrated to produce the activated carbon using carbon dioxide as an oxidizing agent at about 950° C. After washing, the produced activated carbon can again be heated in a $CO_2$ environment to obtain a high grade activated carbon.

In an embodiment, the present method can be conducted at a temperature of about 25° C., or otherwise at room temperature.

In one embodiment, the output biogas scrubbed of hydrogen sulfide can be stored in a biogas storage cylinder.

In another embodiment, the present subject matter relates to a system for removing hydrogen sulfide from a biogas, the system comprising: a scrubber comprising a vertically arranged tube having placed therein a hydrogen sulfide removal media comprising a biomass derived biochar, activated carbon, silica gel, and a metal organic framework; a biogas inlet at a bottom end of the tube for receiving a biogas comprising hydrogen sulfide ($H_2S$) into the tube; and a biogas outlet at a top end of the tube for outputting a biogas scrubbed of hydrogen sulfide.

In this regard, the tube used in the present system can be a steel tube. The steel tube can be of any size desired by the user. In one embodiment, the steel tube can be a 3 meter steel tube having a diameter of 20 cm in its middle section.

In addition, the system can further comprise a plurality of hydrogen sulfide removal mounting discs located inside the tube at equal distances from one another, each of the plurality of hydrogen sulfide removal mounting discs having a scrubber containing dish thereon bearing a portion of the hydrogen sulfide removal media. In an embodiment, the plurality of hydrogen sulfide removal mounting discs comprises three mounting discs placed equidistantly from one another along a length of the tube.

In another embodiment, the system can further comprise a biogas storage cylinder connected to the biogas outlet for receiving and storing the biogas scrubbed of hydrogen sulfide.

Figure 3:
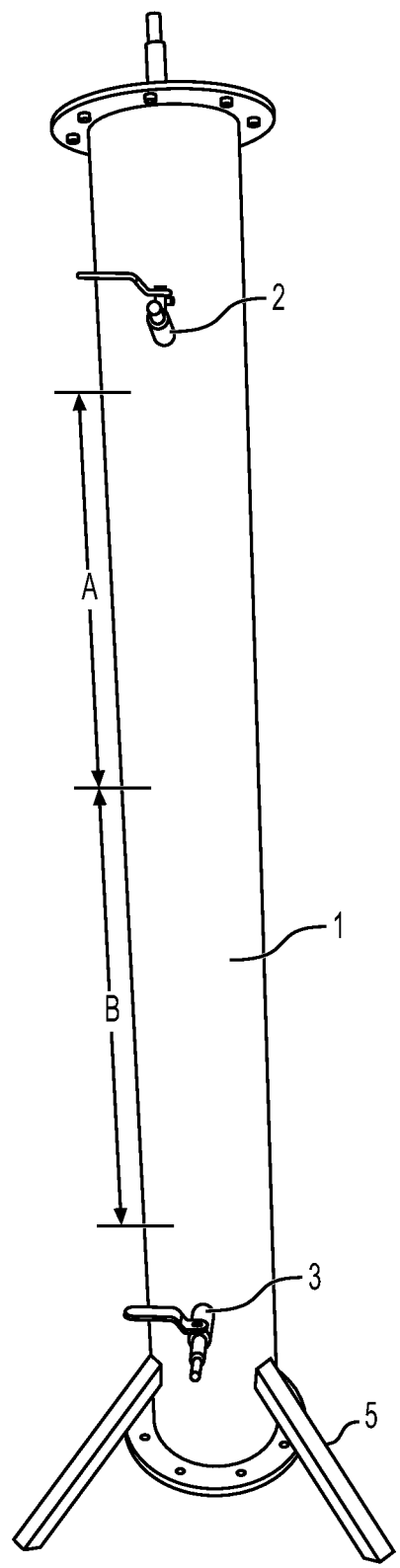
FIG. 3 is a diagram of the present scrubber designed for removing hydrogen sulfide from biogas showing the locations of placing the hydrogen sulfide removal media therein.

Referring to the figures, FIG. 1 shows an exemplary scrubber described herein. The scrubber comprises a stainless steel tube 1 having an inlet 3 for receiving the biogas and an outlet 2 for outputting the biogas scrubbed of hydrogen sulfide. The hydrogen sulfide removal media can be placed on mounting disc 4, which mounting disc 4 can be placed at various positions throughout the steel tube 1. The scrubber can be maintained in a vertical orientation by using stand 5. In use, as seen in FIG. 3, there can be, for example, 3 placements of the hydrogen sulfide removal media placed throughout the steel tube 1, with a distance between a top placement of the hydrogen sulfide removal media and a middle placement of the hydrogen sulfide removal media A being the same as a distance between the middle placement of the hydrogen sulfide removal media and a bottom placement of the hydrogen sulfide removal media B.

Figure 2:
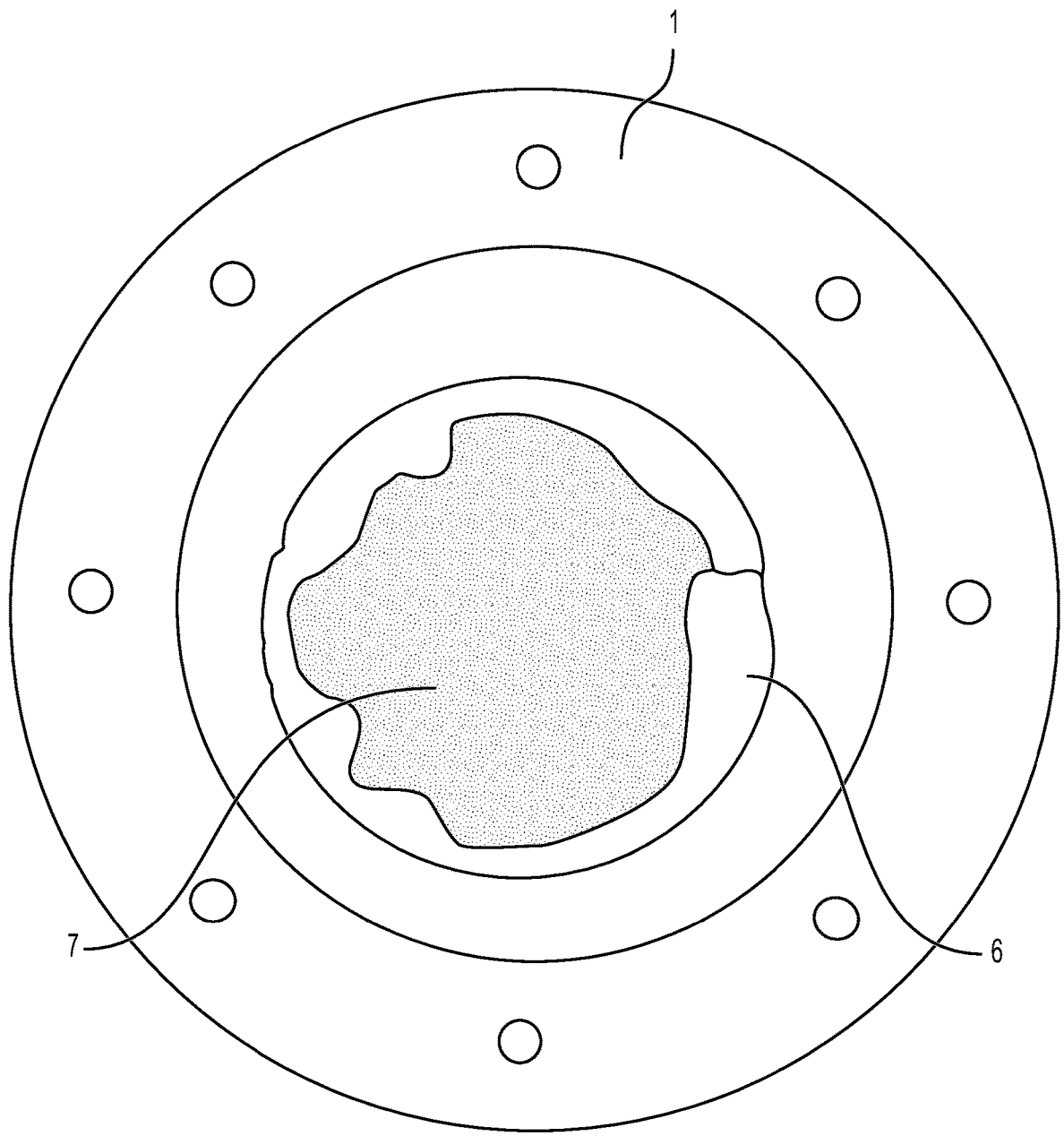
FIG. 2 is a diagram showing the filling of the hydrogen sulfide removal media inside the scrubber.

FIG. 2 shows the hydrogen sulfide removal media 7 placed inside the steel tube 1 and resting on the scrubber containing dish 6. FIG. 4A shows the mounting disc 4 on which the scrubber containing dish 6 rests. FIGS. 4B-4C show placement of the hydrogen sulfide removal media 7 on the scrubbing dish 6, which is then inserted and put into position in the steel tube 1 atop the mounting disc 4.

The present teachings are illustrated by the following examples.

EXAMPLES

Example 1

Preparation of the Biogas

The biogas was produced utilizing cow manure and rice straw in a semi-continuous stirring tank reactor (CSTR). The cow manure and rice straw were fed in to the CSTR in a ratio of 75% and 25% on a weight basis and stirred to produce the biogas.

Example 2

Preparation of the Hydrogen Sulfide Removal Media

The scrubber media was prepared from rice straw based biochar. The $H_2S$ removal media was made by rice straw derived biochar (26%), activated carbon (17%), silica gel (34%), and commercial metal organic framework (MOF-74) (23%).

The rice straw was pyrolyzed at 550° C. to obtain the biochar. A portion of the produced biochar was used as a precursor to produce activated carbon through a carbonization procedure. The activated carbon has a higher surface area, high physio chemical stability, and excellent surface reactivity with different reagents. The rice straw-based biochar was further disintegrated to produce activated carbon with the help of carbon dioxide as oxidizing agent at 950° C. The produced activated carbon was washed 3 times with distilled water and again placed in the furnace in a $CO_2$ environment to achieve high grade activated carbon. 2 grams of biochar was produced from 30 grams of rice straw while the consequent activated carbon produced from the biochar was only 0.3 grams. The prepared media was very stable. The other scrubbing agents like silica gel and MOF-74 were directly purchased from the market.

Example 3

Hydrogen Sulfide Removal

The biogas scrubbing experiments were carried out at room temperature, i.e., 25° C. The biogas flow was kept at 0.5 L/min and the residence time of the biogas was 5 min before collection at the outlet. The biogas was tested by a biogas meter (Optma7 biogas) and also through gas chromatography GC (Shimadzu-GC-2010 plus). The biogas samples were tested before and after the scrubbing by both the biogas meter and through the GC.

The operating procedure was very simple. The biogas flow line was attached to the meter, which provides the biogas composition after 1 minute. While in the GC, a thermal conductivity detector (TCD) was utilized. The oven temperature of the GC was kept at 280° C. while nitrogen was used as a carrier gas. 50 mL of the biogas sample was injected into the TCD column before and after the scrubbing to evaluate the differences. The experiment was repeated 12 times and the average value was obtained.

The prepared media was placed at 3 different positions inside the scrubber. The height of each media placement was about 10 cm and was located at the entrance, then in the middle section, and then before the outlet to enhance scrubbing efficiency. The media containing dish/holder were mounted by the disc as shown in FIGS. 4A-D.

The prepared media was filled in a 3 m steel tube of diameter 20 cm in the middle section. At the bottom of the steel tube, a compressor was attached at the inlet of the biogas. The biogas was pressurized up to 6 mbar and scrubbed through the media. When the biogas passed from the media, it was sent to a storage tank just before utilization at a biogas generator. The biogas before scrubbing contains 2.14% $H_2S$ while after scrubbing it contains only 0.07% $H_2S$, with 95.33% $H_2S$ removal capability.

It is to be understood that the biogas hydrogen sulfide scrubber methods and systems are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of removing hydrogen sulfide from a biogas, the method comprising:

inputting a biogas comprising hydrogen sulfide ($H_2S$) to a scrubber comprising a tube having placed therein a hydrogen sulfide removal media comprising a biomass derived biochar, activated carbon, silica gel, and a metal organic framework;

passing the biogas through the hydrogen sulfide removal media; and outputting a biogas scrubbed of hydrogen sulfide, wherein the biogas is pressurized up to 6 mbar to enable passing through the hydrogen sulfide removal media.

2. The method of claim 1, wherein the method removes at least about 95% by weight of the hydrogen sulfide from the biogas.

3. The method of claim 1, wherein the hydrogen sulfide removal media comprises about 26% by weight of the biomass derived biochar, about 17% by weight of the activated carbon, about 34% by weight of the silica gel, and about 23% by weight of the metal organic framework.

4. The method of claim 1, wherein the biogas comprises about 1% to about 5% by weight of the hydrogen sulfide.

5. The method of claim 1, wherein the tube comprises a steel tube, with the hydrogen sulfide removal media placed in a middle of the steel tube.

6. The method of claim 5, wherein the hydrogen sulfide removal media has a height of about 30 cm in the middle of the steel tube.

7. The method of claim 1, wherein the biogas scrubbed of hydrogen sulfide is used in a biogas plant for producing electrical energy from biogas.

8. The method of claim 1, wherein the biogas is made from cow manure and rice straw in an about 75:25 ratio on a weight basis.

9. The method of claim 1, wherein the biochar is made from rice straw.

10. The method of claim 1, wherein the method is conducted at a temperature of about 25° C.

11. The method of claim 1, wherein the biogas passes through the hydrogen sulfide removal media at a rate of about 0.5 L/min.

12. The method of claim 5, wherein the biogas has a residence time of about 5 min in the scrubber.

13. The method of claim 1, wherein the hydrogen sulfide removal media is placed at three positions in the scrubber, each placement of the hydrogen sulfide removal media being about 10 cm in length, with a first placement of the hydrogen sulfide removal media being at an entrance of the scrubber, a second placement of the hydrogen sulfide removal media being at a middle of the scrubber, and a third placement of the hydrogen sulfide removal media being before an outlet of the scrubber.

14. The method of claim 1, wherein the biogas scrubbed of hydrogen sulfide is stored in a biogas storage cylinder.

* * * * *